US010189355B2

(12) United States Patent
Thomas et al.

(10) Patent No.: US 10,189,355 B2
(45) Date of Patent: Jan. 29, 2019

(54) SAFETY DEVICE FOR A BATTERY CONTACTOR IN AN ELECTRIC VEHICLE

(71) Applicant: Robert Bosch GmbH, Stuttgart (DE)

(72) Inventors: Robert Thomas, Stuttgart (DE); Manuel Roth, Calw (DE)

(73) Assignee: Robert Bosch GmbH, Stuttgart (DE)

( * ) Notice: Subject to any disclaimer, the term of this patent is extended or adjusted under 35 U.S.C. 154(b) by 251 days.

(21) Appl. No.: 15/116,269

(22) PCT Filed: Jan. 28, 2015

(86) PCT No.: PCT/EP2015/051682
§ 371 (c)(1),
(2) Date: Aug. 3, 2016

(87) PCT Pub. No.: WO2015/121065
PCT Pub. Date: Aug. 20, 2015

(65) Prior Publication Data
US 2017/0008402 A1     Jan. 12, 2017

(30) Foreign Application Priority Data
Feb. 11, 2014   (DE) .................. 10 2014 202 416

(51) Int. Cl.
*B60L 3/00* (2006.01)
*B60L 3/04* (2006.01)
(Continued)

(52) U.S. Cl.
CPC .............. *B60L 3/04* (2013.01); *B60L 3/0046* (2013.01); *B60L 3/12* (2013.01); *B60L 11/1851* (2013.01);
(Continued)

(58) Field of Classification Search
CPC ...... B60L 3/04; B60L 11/1879; B60L 3/0046; B60L 3/00; B60L 7/24; B60L 7/14; B60L 7/26
(Continued)

(56) References Cited

U.S. PATENT DOCUMENTS

2011/0037317 A1   2/2011   Kuschnarew et al.
2012/0011362 A1   1/2012   Lambert
(Continued)

FOREIGN PATENT DOCUMENTS

CN   101371652 A   2/2009
CN   103329394 A   9/2013
(Continued)

OTHER PUBLICATIONS

International Search Report for Application No. PCT/EP2015/051682 dated May 18, 2015 (English Translation, 2 pages).

*Primary Examiner* — John W Poos
(74) *Attorney, Agent, or Firm* — Michael Best & Friedrich LLP

(57) ABSTRACT

The invention relates to a safety device (4) for a contactor (2) connected between a secondary battery and an electrical power network, in particular of a motor vehicle that can be driven electrically, comprising at least one electronic evaluating unit (6), which can be connected to at least one electrical component of the secondary battery by means of a communication connection (5), and at least one safety switch (8), which can be controlled by means of the electronic evaluating unit (6) and which can be arranged in an electrical control circuit (7) of the contactor (2), wherein the electronic evaluating unit (6) is designed to receive at least one component-specific piece of actual information (12) from the electrical component via the communication connection (5), to compare the received piece of actual information (12) with at least one piece of target information
(Continued)

stored in the electronic evaluating unit (6), and to control the safety switch (8) in dependence on a result of the comparison in such a way that the electronic evaluating unit closes the safety switch (8) if the piece of actual information (12) corresponds with the piece of target information and opens the safety switch (8) if the piece of actual information (12) does not correspond with the piece of target information.

8 Claims, 2 Drawing Sheets

(51) Int. Cl.
    *B60L 3/12*     (2006.01)
    *B60L 11/18*     (2006.01)
(52) U.S. Cl.
    CPC .......... *B60L 2270/34* (2013.01); *Y02T 10/705* (2013.01); *Y02T 10/7011* (2013.01); *Y02T 90/16* (2013.01)
(58) Field of Classification Search
    USPC ............................ 307/116, 131, 132 E, 141.4
    See application file for complete search history.

(56) References Cited

U.S. PATENT DOCUMENTS

| | | |
|---|---|---|
| 2012/0050054 A1 | 3/2012 | Fujiwara |
| 2012/0078444 A1 | 3/2012 | Mase |
| 2012/0123611 A1 | 5/2012 | Grasso et al. |
| 2013/0197734 A1 | 8/2013 | Okura |
| 2013/0307326 A1 | 11/2013 | Fassnacht |
| 2014/0015456 A1* | 1/2014 | Nishio ...................... B60L 7/14 318/376 |

FOREIGN PATENT DOCUMENTS

| | | |
|---|---|---|
| DE | 102008021542 | 11/2009 |
| DE | 10021811 | 11/2011 |
| DE | 102010041018 A1 | 3/2012 |
| DE | 102011081688 | 3/2012 |
| DE | 102011003082 | 7/2012 |
| JP | 2009171467 | 7/2009 |
| JP | 2010154621 | 7/2010 |
| JP | 2012085470 | 4/2012 |
| WO | 2009001086 | 12/2008 |

\* cited by examiner

SAFETY DEVICE FOR A BATTERY CONTACTOR IN AN ELECTRIC VEHICLE

BACKGROUND OF THE INVENTION

In motor vehicles which are electrically driven, in particular electric vehicles and hybrid electric vehicles, secondary batteries are used, in particular, in order to supply electrical energy to electrical drive devices of the motor vehicle by means of a vehicle-end electrical power supply system by way of said secondary batteries. The secondary batteries are usually in the form of lithium-ion secondary batteries. In addition to individual battery cells, a conventional secondary battery has a large number of electrical components which can be arranged, for example, in a housing of the secondary battery.

Contactors which form part of a so-called "Battery Disconnect Unit" (BDU) are provided in order to connect the secondary batteries to the electrical power supply systems and, respectively, to disconnect secondary batteries, which are connected to the electrical power supply systems, from the electrical power supply systems. A BDU of this kind is known, for example, from WO 2009/001086 A2.

Laid-open specification DE 100 21 811 A1 relates to a removal-prevention means for electronic components of an electronic operating system, which is installed in a motor vehicle, for operating the motor vehicle. The components which are installed in the motor vehicle are connected to one another by means of at least one data line, wherein each component is authorized by the manufacturer to operate in a specific operating system, wherein each component contains an identification code, which is individualized for this specific operating system, in a memory. The identification codes of the components are compared at least for starting the vehicle, wherein each component sends identification signals, which are correlated with the identification code of said component, to the other component and/or receives identification signals from the other components. In this case, the operating system is designed such that it allows proper operation of the vehicle only when all of the components have the same identification code.

Laid-open specification DE 10 2008 021 542 A1 discloses a monitoring apparatus for contact or access protection of a hybrid vehicle, comprising a number of high-voltage components and comprising an electronic control unit which is connected to a low-voltage on-board electrical system battery, the power actuators of the said electronic control unit being connected to a high-voltage battery by means of a circuit breaker and driving at least one electrical machine. The high-voltage components are monitored by means of a line loop and are deactivated when the line loop is open, wherein a magnetic field-sensitive sensor of a releasable contact connection of the electrical machine or of the electronic control unit is connected to the line loop, and wherein a control module of the electronic control unit activates a discharge unit for discharging an energy store in an electric shock-proof manner depending on a sensor signal which is generated when the contact connection is released from the sensor.

Laid-open specification DE 10 2011 003 082 A1 discloses a system for high-voltage disconnection in a vehicle having at least two high voltage-carrying components, each component having a housing, at least one connection element for a data bus and at least one connection element for a high-voltage supply, wherein each high voltage-carrying component is designed to locally detect an event, which event is intended to trigger high-voltage disconnection, characterized in that each high voltage-carrying component is locally designed to trigger high-voltage disconnection of the high voltage-carrying component in response to the detection of the event. As an advantageous embodiment, access to components which are at a dangerous voltage is possible only after a connection element of the data bus has been removed, the removal or disruption of said connection element leading to rapid disconnection of the electrical system.

Replacement of individual electrical components of a secondary battery by laypersons can lead to environmental damage and/or to a defect. This damage can occur directly, for example by a flashover, or only over the course of time during operation of a secondary battery, for example by long-term overloading of a battery cell.

SUMMARY OF THE INVENTION

The subject matter of the invention is a safety device for a contactor which is connected between a secondary battery and an electrical power supply system, in particular of a motor vehicle which can be electrically driven, having at least one electronic evaluation unit which can be connected to at least one electrical component of the secondary battery by means of a communication connection, and having at least one safety switch which can be driven by way of the electronic evaluation unit and can be arranged in an electrical control circuit of the contactor, wherein the electronic evaluation unit is designed to receive at least one component-specific item of actual information from the electrical component by means of the communication connection, to compare the received item of actual information with at least one item of target information which is stored in the electronic evaluation unit, and to drive the safety switch depending on a result of the comparison in such a way that said electronic evaluation unit closes the safety switch when the item of actual information corresponds to the item of target information, and opens the safety switch when the item of actual information does not correspond to the item of target information.

According to the invention, an additional control channel is provided, it being possible for items of actual information to be exchanged between electrical components of the secondary battery, for example of a battery management system, of the controller or the like, and the safety device or the electronic evaluation unit of said safety device by means of said additional control channel. If an item of actual information corresponds to an item of target information which is stored in the electronic evaluation unit, the safety switch, which is designed as a normally-open contact for example, can be switched or closed by means of the additional control channel. The electronic evaluation device can be designed to check the items of actual information from individual electrical components of a secondary battery.

Replacement of electrical components and therefore misuse of components of this kind and a corresponding secondary battery by unauthorized persons is made more difficult by the safety device according to the invention since, on account of the comparison of component-specific items of actual information with items of target information which are stored in the evaluation device, it is possible to check whether the secondary battery is composed of suitable or unsuitable electrical components. In the latter case, the comparison of items of actual information with items of target information leads to the result that at least one item of actual information does not correspond to an item of target information, so that the safety switch is not closed. As a result, the electrical control circuit of the contactor is interrupted, so that the contactor cannot be switched or closed.

The component-specific items of actual information which are associated with the individual electrical components of the secondary battery during first initialization of a secondary battery are stored in the form of items of target information in the electronic evaluation unit. A subsequent change in the items of target information is not possible or possible only with a considerable amount of expenditure.

The subject matter of the invention is also a safety device for a contactor which is connected between a secondary battery and an electrical power supply system, in particular of a motor vehicle which can be electrically driven, having at least one electronic evaluation unit which can be connected to at least one electrical component of the secondary battery by means of a communication connection, and having at least one safety switch which can be driven by way of the electronic evaluation unit and can be arranged in a control line of the contactor, which control line controls a control switch which is arranged in an electrical control circuit of the contactor, wherein the electronic evaluation unit is designed to receive at least one component-specific item of actual information from the electrical component, to compare the received item of actual information with at least one item of target information which is stored in the electronic evaluation unit, and to drive the safety switch depending on a result of the comparison in such a way that said electronic evaluation unit closes the safety switch when the item of actual information corresponds to the item of target information, and opens the safety switch when the item of actual information does not correspond to the item of target information.

An additional control channel is provided in the case of this safety device too, it being possible for items of actual information to be exchanged between electrical components of the secondary battery, for example of a battery management system, of the controller or the like, and the safety device or the electronic evaluation unit of said safety device by means of said additional control channel. If an item of actual information corresponds to an item of target information which is stored in the electronic evaluation unit, the safety switch, which is designed as a normally-open contact for example, can be switched or closed by means of the additional control channel. The electronic evaluation device can be designed to check the items of actual information from individual electrical components of a secondary battery.

Replacement of electrical components and therefore misuse of components of this kind and a corresponding secondary battery by unauthorized persons is likewise made more difficult by said safety device according to the invention since, on account of the comparison of component-specific items of actual information with items of target information which are stored in the evaluation device, it is possible to check whether the secondary battery is composed of suitable or unsuitable electrical components. In the latter case, the comparison of items of actual information with items of target information leads to the result that at least one item of actual information does not correspond to an item of target information, so that the safety switch is not closed. As a result, the control line which controls the control switch is interrupted, so that the contactor cannot be switched or closed.

The component-specific items of actual information which are associated with the individual electrical components of the secondary battery during first initialization of a secondary battery are preferably also stored in the form of items of target information in the electronic evaluation unit here. A subsequent change in the items of target information is not possible or possible only with a considerable amount of expenditure.

According to one advantageous refinement, the electronic evaluation device has a self-holding function by means of which the safety switch, which is closed on account of correspondence between the item of actual information and the item of target information, is kept closed by the electronic evaluation unit for a time interval of prespecifiable length. This is advantageous particularly in the case of cyclical exchange of component-specific items of actual information since a switch which is closed on account of correspondence between the items of actual information and items of target information is kept closed until subsequent replacement of items of actual information and comparison of said actual items of information with items of target information. The self-holding function can be realized by software or hardware.

According to a further advantageous refinement, the electronic evaluation unit can be connected to a bus system of the secondary battery in order to form the communication connection with the at least one electrical component of the secondary battery. This constitutes a simple possible way of forming the communication connection. The bus system can be in the form of a CAN bus system.

The subject matter of the invention is additionally a contactor arrangement comprising at least one contactor for connecting a secondary battery to an electrical power supply system, in particular of a motor vehicle which can be electrically driven, characterized by at least one safety device according to one of the abovementioned refinements or any desired combination of said refinements. The advantages cited above with reference to the safety device are correspondingly associated with this contactor arrangement. The contactor is preferably combined with the safety device to form an assembly of compact design.

The subject matter of the invention is further a method for controlling a contactor which is connected between a secondary battery and an electrical power supply system, in particular of a motor vehicle which can be electrically driven, wherein the contactor is controlled in such a way that it can be closed by means of an electrical control circuit, which is associated with the contactor, exclusively when at least one component-specific item of actual information, which is associated with an electrical component of the secondary battery, corresponds to at least one item of target information which is stored in the contactor. The advantages cited above with reference to the safety device are correspondingly associated with this method.

According to one advantageous refinement, the item of actual information used is an unambiguous actual identifier of the electrical component of the secondary battery, and the item of target information used is an unambiguous target identifier. An unambiguous identifier of a battery management system or of a controller can serve as the item of actual information.

According to a further advantageous refinement, a check in respect of whether the momentary component-specific item of actual information corresponds to the item of target information which is stored in the contactor is made at prespecifiable cyclical time intervals. As a result, the state of a secondary battery or the proper assembly of said secondary battery can be monitored.

The item of actual information is advantageously transmitted in encrypted form. As a result, unauthorized access to items of actual information and associated manipulation is not possible or is possible only with difficulty.

The invention will be explained by way of example below with reference to the appended figures on the basis of preferred exemplary embodiments, wherein the features presented below both respectively by themselves and in different combinations with one another can constitute an aspect of the invention. In the figures:

DETAILED DESCRIPTION

Figure 1:
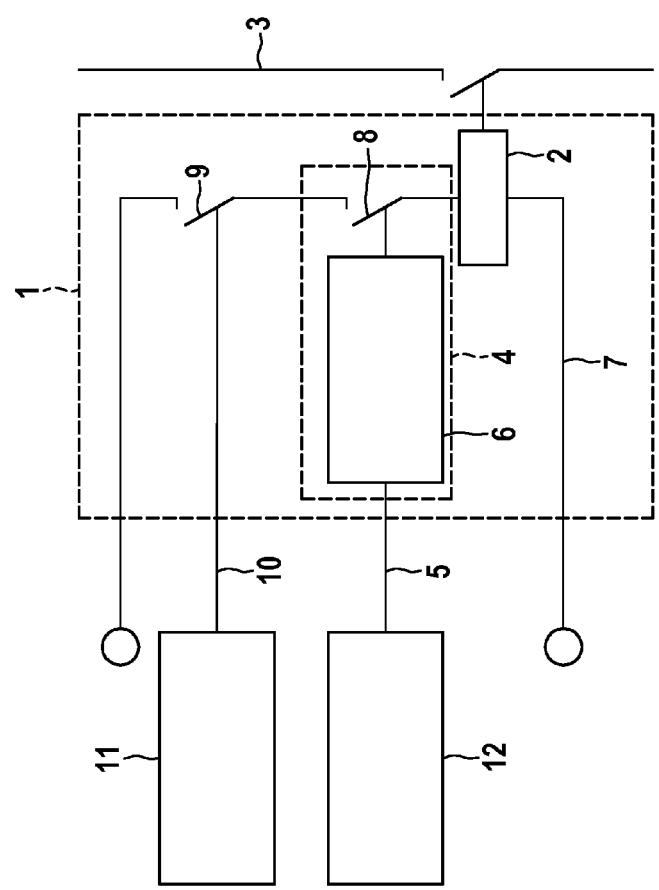
FIG. 1: is a schematic illustration of an exemplary embodiment of a contactor arrangement according to the invention.

FIG. 1 is a schematic illustration of an exemplary embodiment of a contactor arrangement 1 according to the invention. The contactor arrangement 1 comprises a contactor 2 for connecting a secondary battery, not illustrated, to an electrical power supply system, not illustrated, of a motor vehicle which can be electrically driven, wherein the contactor 2 is connected into a high-voltage line 3 which connects the secondary battery to the electrical power supply system.

The contactor arrangement 1 furthermore comprises a safety device 4 which has an electronic evaluation unit 6 which is connected to at least one electrical component, not shown, of the secondary battery by means of a communication connection 5, and has a safety switch 8 which can be driven by way of the electronic evaluation unit 6 and is arranged in an electrical control circuit 7 of the contactor 2. Furthermore, a control switch 9 which receives control signals from a control unit 11 by means of a further communication connection 10 is furthermore connected into the electrical control circuit 7. The electronic evaluation unit 6 is connected to a bus system, not illustrated, of the secondary battery in order to form the communication connection 5 to the at least one electrical component of the secondary battery.

The electronic evaluation unit 6 is designed to receive at least one component-specific item of actual information 12 from the electrical component by means of the communication connection 5, to compare the received item of actual information 12 with at least one item of target information which is stored in the electronic evaluation unit 6, and to drive the safety switch 8 depending on a result of the comparison in such a way that said electronic evaluation unit closes the safety switch 8 when the item of actual information 12 corresponds to the item of target information, and opens the safety switch 8 when the item of actual information 12 does not correspond to the item of target information.

The electronic evaluation device 6 has a self-holding function by means of which the safety switch 8, which is closed on account of correspondence between the item of actual information 12 and the item of target information, is kept closed by the electronic evaluation unit 6 for a time interval of prespecifiable length.

Figure 2:
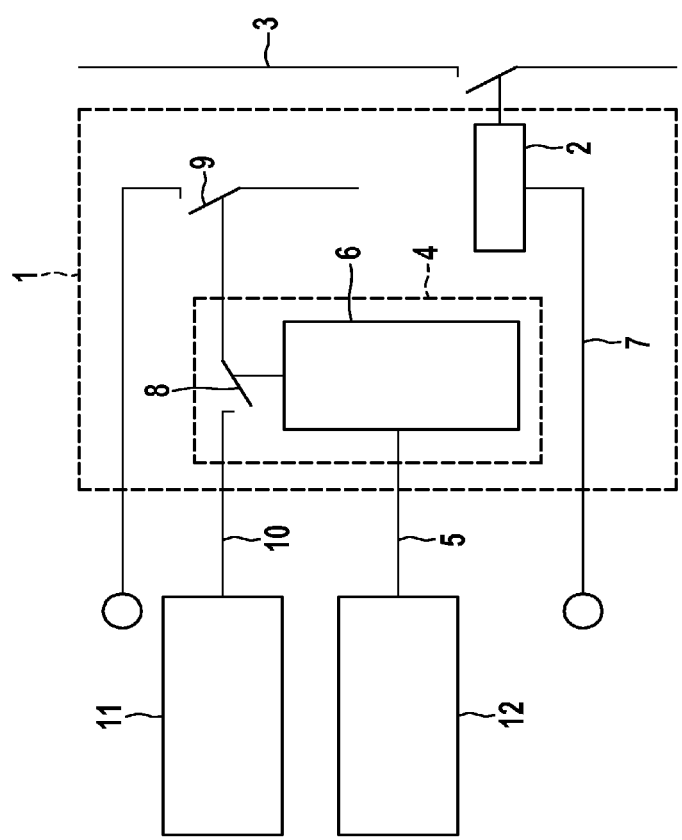
FIG. 2: is a schematic illustration of a further exemplary embodiment of a contactor arrangement according to the invention.

FIG. 2 is a schematic illustration of a further exemplary embodiment of a contactor arrangement 1 according to the invention. The contactor arrangement 1 comprises a contactor 2 for connecting a secondary battery, not illustrated, to an electrical power supply system, not illustrated, of a motor vehicle which can be electrically driven, wherein the contactor 2 is connected into a high-voltage line 3 which connects the secondary battery to the electrical power supply system.

The contactor arrangement 1 furthermore comprises a safety device 4 which has an electronic evaluation unit 6 which can be connected to at least one electrical component, not shown, of the secondary battery by means of a communication connection 5, and a safety switch 8 which can be driven by way of the electronic evaluation unit 6 and is arranged in a control line 10 of the contactor 2, which control line controls a control switch 9 which is arranged in an electrical control circuit 7 of the contactor 2. The electronic evaluation unit 6 is connected to a bus system, not illustrated, of the secondary battery in order to form the communication connection 5 to the at least one electrical component of the secondary battery.

The electronic evaluation unit 6 is designed to receive at least one component-specific item of actual information 12 from the electrical component, to compare the received item of actual information 12 with at least one item of target information which is stored in the electronic evaluation unit 6, and to drive the safety switch 8 depending on a result of the comparison in such a way that said electronic evaluation unit closes the safety switch 8 when the item of actual information 12 corresponds to the item of target information, and opens the safety switch 8 when the item of actual information 12 does not correspond to the item of target information. The electronic evaluation unit 6 is connected to a bus system, not illustrated, of the secondary battery in order to form the communication connection 5 to the at least one electrical component of the secondary battery.

The electronic evaluation device 6 has a self-holding function by means of which the safety switch 8, which is closed on account of correspondence between the item of actual information 12 and the item of target information, is kept closed by the electronic evaluation unit 6 for a time interval of prespecifiable length.

The invention claimed is:

1. A safety device (4) for a contactor (2) which is connected between a secondary battery and an electrical power supply system, the safety device comprising:
at least one electronic evaluation unit (6) connected to at least one electrical component of the secondary battery by means of a communication connection (5), and
at least one safety switch (8) driven by way of the electronic evaluation unit (6) and arranged in an electrical control circuit (7) of the contactor (2),
wherein the electronic evaluation unit (6) is configured to
receive at least one component-specific item of actual information (12), which is an unambiguous actual identifier of the electrical component of the secondary battery, from the electrical component by means of the communication connection (5),
compare the received item of actual information (12) with at least one item of target information which is an unambiguous target identifier stored in the electronic evaluation unit (6), and
drive the safety switch (8) depending on a result of the comparison in such a way that said electronic evaluation unit closes the safety switch (8) when the item of actual information (12) corresponds to the item of target information, and opens the safety switch (8) when the item of actual information (12) does not correspond to the item of target information.

2. A safety device (4) for a contactor (2) which is connected between a secondary battery and an electrical power supply system, the safety device comprising:
- at least one electronic evaluation unit (6) which can be connected to at least one electrical component of the secondary battery by means of a communication connection (5), and
- at least one safety switch (8) driven by way of the electronic evaluation unit (6) and arranged in a control line (10) of the contactor (2), wherein the control line controls a control switch (9) is arranged in an electrical control circuit (7) of the contactor (2),
- wherein the electronic evaluation unit (6) is configured to
  - receive at least one component-specific item of actual information (12), which is an unambiguous actual identifier of the electrical component of the secondary battery, from the electrical component,
  - compare the received item of actual information (12) with at least one item of target information which is an unambiguous target identifier stored in the electronic evaluation unit (6), and
  - drive the safety switch (8) depending on a result of the comparison in such a way that said electronic evaluation unit closes the safety switch (8) when the item of actual information (12) corresponds to the item of target information, and opens the safety switch (8) when the item of actual information (12) does not correspond to the item of target information.

3. The safety device (4) as claimed in claim 1, wherein the electronic evaluation device (6) has a self-holding function by means of which the safety switch (8), which is closed on account of correspondence between the item of actual information (12) and the item of target information, is kept closed by the electronic evaluation unit (6) for a time interval of prespecifiable length.

4. The safety device (4) as claimed in claim 1, wherein the electronic evaluation unit (6) is configured to be connected to a bus system of the secondary battery in order to form the communication connection (5) with the at least one electrical component of the secondary battery.

5. A contactor arrangement (1) comprising at least one contactor (2) for connecting a secondary battery to an electrical power supply system and at least one safety device (4) as claimed in claim 1.

6. A method for controlling a contactor (2) which is connected between a secondary battery and an electrical power supply system, the method comprising:
- controlling the contactor in such a way that it can be closed by means of an electrical control circuit, which is associated with the contactor (2), exclusively when at least one component-specific item of actual information (12) is an unambiguous actual identifier of the electrical component of the secondary battery, corresponds to at least one item of target information which is an unambiguous target identifier stored in the contactor.

7. The method as claimed in claim 6, wherein a check in respect of whether the momentary component-specific item of actual information (12) corresponds to the item of target information which is stored in the contactor (2) is made at prespecifiable cyclical time intervals.

8. The method as claimed in claim 6, wherein the item of actual information (12) is transmitted in encrypted form.

* * * * *